United States Patent [19]

Paar et al.

[11] Patent Number: 5,101,000
[45] Date of Patent: Mar. 31, 1992

US005101000A

[54] PROCESS FOR THE PREPARATION OF BINDERS FOR CATHODICALLY DEPOSITABLE PAINTS, THE BINDERS PRODUCED, AND TO THE USE THEREOF IN PAINTS

[75] Inventors: Willibald Paar; Helmut Hönig; Georg Pampouchidis, all of Graz, Austria

[73] Assignee: Vianova Kunstharz, A.G., Werndorf, Austria

[21] Appl. No.: 570,624

[22] Filed: Aug. 21, 1990

[30] Foreign Application Priority Data

Aug. 23, 1989 [AT] Austria ................................. 1992/89
Jul. 9, 1990 [AT] Austria ................................. 1454/90

[51] Int. Cl.$^5$ .............................................. C08G 59/50
[52] U.S. Cl. ................................... 528/111; 523/414; 523/415; 523/417; 523/418
[58] Field of Search ............... 523/414, 415, 417, 418; 528/111

[56] References Cited

U.S. PATENT DOCUMENTS

| | | | |
|---|---|---|---|
| 3,914,204 | 10/1975 | Helm et al. | 528/126 |
| 4,421,906 | 12/1983 | Waddill et al. | 528/111 |
| 4,423,166 | 12/1983 | Moriarity | 528/111 |
| 4,608,300 | 8/1986 | Gruber | 528/93 |

*Primary Examiner*—Paul R. Michl
*Assistant Examiner*—Christopher P. Rogers
*Attorney, Agent, or Firm*—Breiner & Breiner

[57] ABSTRACT

A process for the preparation of water-dilutable binders for cathodically depositable electrodeposition paints wherein 5 to 60 mol % of the epoxy groups of a resinous compound having at least two 1,2-epoxy groups per molecule are reacted with disecondary diamines obtained by the reaction of polypropylene glycol diglycidylethers or polypropylene glycol diacrylates with compounds containing a primary amino group is described. The binders prepared in accordance with the invention are suitable, in particular, for formulating electrodeposition paints, to provide films having a greater layer thickness under normal deposition conditions.

17 Claims, No Drawings

PROCESS FOR THE PREPARATION OF BINDERS FOR CATHODICALLY DEPOSITABLE PAINTS, THE BINDERS PRODUCED, AND TO THE USE THEREOF IN PAINTS

FIELD OF INVENTION

The present invention relates to a process for the preparation of binders, to the binders per se, and to the use of the binders in cathodically depositable electrodeposition paints. More particularly, the invention relates to binders which are the reaction products of polyether-modified diamines with epoxy resins in order to improve the deposition characteristics of the binders; the stability of the bath containing the binders, and the properties of films prepared from paints comprising the binders. The binders prepared in accordance with the invention are suitable in particular for formulating electrodeposition paints whereby films having a greater layer thickness can be obtained even under normal deposition conditions.

BACKGROUND OF INVENTION

There is considerable interest, in particular on the part of the automobile industry, in paint binders where it is possible to have an increase in the paint layer thicknesses in the electrocoating of components wired up as the cathode of an electrodeposition system. It is to be expected that if suitable materials are available it will be possible to dispense with the layers of filler heretofore applied between the priming coat and the top coat.

The ability to increase the layer thickness has only been realized to a limited extent through use of known materials at least partly because the equipment technology currently available does not lead to the desired result. Thus, an arbitrary increase in the deposition voltage results in surface defects caused by so-called breakdowns, i.e., by electrolytic effects, when the maximum permissible working voltage for the binder is exceeded. Prolongation of the coating time is in most cases not possible because of the sequence of operations in assembly line manufacture. Additionally, as is known, an automatic limitation on the film thickness is set up in electrocoating as a result of the build-up of a film resistance, precluding layer thickness beyond a certain point.

Attempts, therefore, have been made to influence the layer thickness by means of additives to the electrodeposition paint. It is possible to a certain extent to increase film thickness by combining the binders with water-insoluble components of fairly high molecular weight. The layer thickness of 8 to 14 $\mu$m, characteristic of cathodic deposition, can only be increased, without impairing the properties of the film, to about 18 to 22 $\mu$m. Binder combinations of this type are described, for example, in EP-B1-0,028,402. The same effect can also be achieved by admixing other components which are virtually water-insoluble under the conditions of the CED process, for example those based on oxazolidine compounds, as described in Austrian Patent No. 377,775.

Additives for increasing the layer thickness based on quaternary ammonium salts, for example methyldodecylbenzyltrimethylammonium chloride, methyldodecylxylylene-bis-trimethylammonium acetate, and the like; are described in EP-A1-0,059,468. The effect of the additives is essentially to increase the film conductivity (or to reduce the film resistance). Since any alteration in the film resistance has an effect on the throwing power, i.e., on the coating of electrically screened areas of the component, an additive of this type requires particularly careful control of the bath.

Another contemplated method of increasing the film thicknesses requires adding sparingly volatile water-insoluble organic solvents, for example ethyleneglycol monohexylether. The effect of such additives is to alter the dispersion character of the bath material, which also has an effect on the film resistance. However, with the large surface of the electrocoating tanks, it is not possible to avoid evaporation of these additives in spite of their high boiling points, as a result of which it is difficult to avoid fluctuations in the coating without a special effort in monitoring. In addition, the stability of the bath materials is adversely affected by additives of this type and the optimal deposition voltage is reduced.

Reaction products of polyepoxy compounds with polyoxyalkylenepolyamines for achieving cathodically applicable films having an increased reliability against cratering are described in EP 0,070,550. However, because of the polyfunctionality of the raw materials employed, these products cannot be prepared in a reproducible manner, and tend to gel when they are synthesized.

EP 0,193,685 describes additives for cationic electrodeposition paints based on reaction products of polyoxyalkylenepolyamines with monoepoxides. However, because of their very strong hydrophilic character, these additives result, when exposed to water of condensation or salt spray, in the detachment of the stoved film on a steel sheet which has not been pretreated.

SUMMARY OF INVENTION

It has now been found that by using cathodically depositable paints containing as binders polyepoxy resins which have been modified proportionately with disecondary diamines, the desired increase in layer thickness can be obtained without the disadvantages hereinbefore described. The modifiers employed in accordance with the invention are obtained by reacting polypropylene glycol diglycidyl compounds, or polypropylene glycol diacrylates, with primary alkylmonoamines in which the alkyl radical optionally contains one or two hydroxyl group(s) or one tertiary amino group.

Accordingly, the present invention relates to a process for the preparation of binders which are based on amine-modified epoxy resins which are water-dilutable after complete or partial neutralization with inorganic and/or organic acids, the process being characterized in that 5 to 60 mol %, preferably 10 to 35 mol %, of the epoxy groups of a resinous component having at least two 1,2-epoxy groups per molecule are reacted at 60° to 120° C. with a disecondary diamine of the general formula—

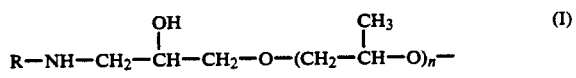

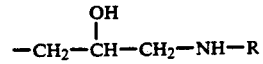

and/or

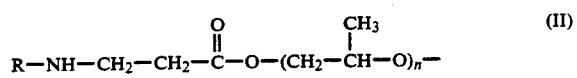

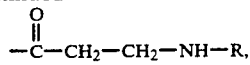

wherein R is an alkyl group having 4 to 18 carbon atoms or a monohydroxyalkyl group or a dihydroxyalkyl group or a tertiary-aminoalkyl group, and n represents a number 2 through 12, and the remainder of the epoxy groups are reacted completely at 60° to 120° C. with amines and/or carboxylic acids and/or substituted phenols, the amount of the basic components being so chosen that the end product has a theoretical amine number of at least 30 mg KOH/g, preferably 50 to 110 mg KOH/g.

The invention also relates to the binders produced by the process and to the use of the binders produced in formulating electrodeposition paints whereby films having a greater layer thickness can be obtained even under normal deposition conditions.

The process according to the invention makes it possible to obtain, in a simple and accessible manner, products which can be employed as binders in combination with curing components or as the sole binder component when appropriately modified with curable groups, such as halfmasked diisocyanates, but can also, by virtue of their good pigment wetting, be employed for the preparation of pigment pastes for subsequent mixture with other cathodically depositable electrodeposition paint binders.

Suitable resin-like compounds or resinous components having at least two 1,2-epoxy groups which are reacted with the disecondary diamines in accordance with the invention are, in particular, the known epoxy resins obtained by reacting bisphenols, novolaks, glycols, etc., with epichlorohydrin or methylepichlorohydrin. A broad range of these products is commercially available and described in detail in many textbooks. Products based on bisphenol A or novolaks having an epoxide equivalent weight between 170 and 1000 are particularly preferred.

The disecondary diamines of general formula (I) employed in accordance with the invention are obtained by reacting 1 mol of a polypropylene glycol diglycidylether having a molecular weight between 200 and 800 with 2 mols of a compound containing a primary amino group.

Amines of general formula (II) are obtained by reacting 1 mol of a dipropylene or polypropylene glycol diacrylate with 2 mols of a compound containing a primary amino group.

The amines used for the synthesis of compounds (I) and (II) are primary monoalkylamines, such as butylamine and its homologues, primary alkanol monoamines, such as monoethanolamine and its homologues, or dihydroxyalkylamines exemplified by 2-aminoethylpropanediol, or primary-tertiary alkyldiamines, such as 3-dimethylamino-1-propylamine, and homologous compounds thereof.

The preparation of the disecondary diamines of group (I) employed in accordance with the present invention is effected by initially taking the primary amine and adding the diepoxy compound slowly at 40°–80° C. The reaction mass is then kept at approximately 80° C. until all the epoxy groups have been completely consumed. Any unreacted amine is removed by vacuum distillation.

The polypropylene glycol diglycidylethers required for the preparation of the disecondary diamines of group (I) often contain considerable amounts of hydrolyzable chlorine which can result in increased corrosion of equipment in electrodeposition plants. In a particular embodiment, therefore, the disecondary diamines of group (I) are subjected, immediately after they have been prepared, to a washing process in order to reduce their content of hydrolyzable chlorine.

An amount of water corresponding to 20 to 40% of the original volume of the reaction mixture is added at 60° to 80° C. with vigorous stirring. Stirring is continued for a further hour at 70° to 80° C., and an entraining agent, preferably xylene, is then added. The mixture is allowed to stand without stirring until phase separation is complete. The aqueous phase is separated off, the water still present in the mixture is removed by azeotropic distillation, and, finally, the circulation agent is removed in vacuo.

The disecondary diamines of group (II) are obtained by initially taking the amine and adding the diacrylate compound slowly at 30°–35° C., with cooling. The mixture is then kept at 40° C. for a further three hours in order to complete the reaction. If appropriate, the products are dissolved in a solvent. Suitable solvents are glycol monoethers or glycol diethers. It is preferable to employ methoxypropanol or ethoxypropanol. The preparation of the binders is effected by reacting the components at 60°–120° C. until free epoxy groups can no longer be detected.

The remaining amines, carboxylic acids, or substituted phenols employed for the reaction with the epoxy groups in the epoxy resins which have remained free, described as "residual modifiers" in the examples, are known to those skilled in the art.

The following examples illustrate the invention, but do not represent any limitation of its scope. Unless otherwise stated, all data in parts or percentages relate to weight units. All the data in the tables relate to 100% solids content. The following abbreviations are used in the examples:

| | |
|---|---|
| DE 1 | polypropylene glycol diglycidylether having an epoxide equivalent of 200 |
| DE 2 | polypropylene glycol diglycidylether having an epoxide equivalent of approximately 320 |
| EHA | 2-ethylhexylamine |
| MIPA | monoisopropanolamine |
| AEPD | 2-amino-2-ethylpropane-1,3-diol |
| DEAPA | 3-diethylamino-1-propylamine |
| DEHA | di-2-ethylhexylamine |
| DPGDA | dipropylene glycol diacrylate |
| TPGDA | tripropylene glycol diacrylate |
| EPH 1 | epoxy resin based on bisphenol A and epichlorohydrin, epoxide equivalent approximately 200 |
| EPH II | epoxy resin based on bisphenol A and epichlorohydrin, epoxide equivalent approximately 500 |
| MP | methoxypropanol |
| EP | ethoxypropanol |
| INA | isononanoic acid |
| NPH | nonylphenol |
| SPH | reaction product of 1 mol of phenol with 2 mols of DEAPA and 2 mols of formaldehyde and with 2 mols of TDI (MW = 986) half-masked with 2-ethylhexanol; the preparation of this product is described, for example, in Austrian Patent No. 382,160 |
| TDI | toluylene diisocyanate (commercial mixture of isomers containing 80% of 2,4-TDI) |
| H 1 | reaction product of 1 mol of trimethylolpropane with 3 mols of a TDI half-masked with MP (urethane crosslinking agent) |
| H 2 | transesterification curing agent analogous |

-continued

| | |
|---|---|
| | to Example 2 of Austrian Patent No. 372,099 (transesterification product from 3 mols of dimethyl malonate and 1 mol of trimethylolpropane) (H 1 and H 2 are employed if the binders do not have self-crosslinking properties) |
| Sn | tin catalyst (dibutyltin dilaurate), calculated as metal |
| Pb | lead catalyst (lead octoate), calculated as metal |

The starting materials for the disecondary diamines (DISA) employed in accordance with the present invention in the examples are collated in Table 1.

For the preparation of DISA 1 - 4, the primary amine is initially charged to a suitable reaction vessel and the epoxy compound is added slowly with the temperature rising, at 40°-80° C. The temperature is kept at 80° C. until the epoxy groups are completely reacted. Residues of unreacted amine are then removed from the mixture in vacuo.

In a subsequent washing process for reducing the content of hydrolyzable chlorine, water in an amount of 20 to 40% of the original volume of the reaction mixture is added at 60° to 80° C., with vigorous stirring. Stirring is continued for a further hour at 70° to 80° C., and an entraining agent, preferably xylene, is then added. The mixture is allowed to stand without stirring until the phases have separated completely. The aqueous phase is separated off, the water still remaining in the mixture is removed by azeotropic distillation, and finally the circulation agent is removed in vacuo. Figures for the content of hydrolyzable chlorine in DISA 1 - 4 before and after the washing process are contrasted in Table 1A.

In the case of DISA 5 and 6, the slow addition of the diacrylate compound is carried out at 30°-35° C. with cooling. The mixture is then kept at 40° C. for three hours.

TABLE 1A

| | ppm of Hydrolyzable Chlorine | |
|---|---|---|
| | Before Washing Process | After Washing Process |
| DISA 1 | approx. 8000 | approx. 2500 |
| DISA 2 | approx. 4500 | approx. 1900 |
| DISA 3 | approx. 4000 | approx. 1200 |
| DISA 4 | approx. 8000 | approx. 900 |

Table 2 summarizes the synthesis of the binders prepared in accordance with the invention. All the components are mixed in a suitable reaction vessel at 60° C. The temperature is raised slowly to 80° C., and is maintained at this level until free epoxy groups can no longer be detected.

The binders prepared as in Table 2 are mixed with the designated crosslinking agent and the designated catalyst in the proportions by weight indicated in Table 3. The amount of neutralizing agent for the preparation of a stable aqueous clear lacquer (in millimol of formic acid/100 g of solid resin) is indicated in the last column of the table.

For the preparation of pigmented paints, the binder combination 1–10 are processed in accordance with the following formulation:

| |
|---|
| 100 parts of solid resin |
| 0.5 part of carbon black |
| 3.3 parts of basic lead silicate pigment |
| 35.5 parts of titanium dioxide |
| 5 parts of monoethylene glycol monohexylether |

The pigment paints are tested by electrical deposition onto a non-phosphated, degreased steel sheet connected as the cathode. The films are then stoved for 25 minutes at 180° C., and their stability in the ASTM salt spray test is tested for 360 hours. The relevant data are collated in Table 4. The comparison example used was a cathodically depositable ET paint according to Example 1 of EP 0,193,685 (V).

TABLE 1

| | Diglycidyl Compound | | Diacrylate | | Primary Amine | | | |
|---|---|---|---|---|---|---|---|---|
| | Amount | Type | Amount | Type | Amount | Type | SC[1] | MW[2] |
| DISA 1 | 400 | DE 1 | — | — | 258 | EHA | 100 | 658 |
| DISA 2 | 640 | DE 2 | — | — | 146 | MIPA | 80 MP | 786 |
| DISA 3 | 640 | DE 2 | — | — | 238 | AEPD | 90 EP | 878 |
| DISA 4 | 400 | DE 1 | — | — | 260 | DEAPA | 80 EP | 660 |
| DISA 5 | — | — | 304 | TPGDA | 258 | EHA | 100 | 358 |
| DISA 6 | — | — | 246 | DPGDA | 238 | AEPD | 100 | 338 |

[1] Solids Content %, Solvent
[2] Molecular Weight, Calculated

TABLE 2

| | Epoxy Resin | | | DISA | | | Residual Modifier | | | | |
|---|---|---|---|---|---|---|---|---|---|---|---|
| Ex. | Amount | (Equivalents) | Type | Amount | (Equivalents) | Type | Amount | (Equivalents) | Type | MW[1] | AN[2] |
| 1 | 200 | (1.0) | EPH I | 263 | (0.6) | DISA 3 | 2366 | (2.4) | SPH | 3829 | 79 |
|   | 1000 | (2.0) | EPH II | | | | | | | | |
| 2 | 1500 | (3.0) | EPH II | 393 | (1.0) | DISA 2 | 65 | (1.0) | DEAPA | 2197 | 76 |
|   | | | | | | | 239 | (1.0) | DEHA | | |
| 3 | 800 | (4.0) | EPH I | 254 | (1.5) | DISA 6 | 98 | (1.5) | DEAPA | 1372 | 122 |
|   | | | | | | | 220 | (1.0) | NPH | | |
| 4 | 400 | (2.0) | EPH I | 660 | (2.0) | DISA 4 | 336 | (2.0) | INA | 2396 | 93 |
|   | 1000 | (2.0) | EPH II | | | | | | | | |
| 5 | 2000 | (4.0) | EPH II | 494 | (1.5) | DISA 1 | 2465 | (2.5) | SPH | 4959 | 73 |
| 6 | 400 | (2.0) | EPH I | 329 | (1.0) | DISA 1 | 26 | (0.7) | MIPA | 1408 | 105 |
|   | 500 | (1.0) | EPH II | 107 | (0.6) | DISA 5 | 46 | (0.7) | DEAPA | | |
| 7 | 200 | (1.0) | EPH I | 592 | (1.8) | DISA 1 | 52 | (0.8) | DEAPA | 1911 | 76 |
|   | 1000 | (2.0) | EPH II | | | | 67 | (0.4) | INA | | |

TABLE 2-continued

| Ex. | Epoxy Resin Amount | (Equivalents) | Type | DISA Amount | (Equivalents) | Type | Residual Modifier Amount | (Equivalents) | Type | MW[1] | AN[2] |
|---|---|---|---|---|---|---|---|---|---|---|---|
| 8 | 800 | (4.0) | EPH I | 143 | (0.8) | DISA 5 | 119 | (2.0) | AEPD | 1140 | 147 |
|   |     |       |       |     |       |        | 78  | (1.2) | DEAPA |      |     |
| 9 | 2000 | (4.0) | EPH II | 660 | (2.0) | DISA 4 | 440 | (2.0) | NPH | 3100 | 72 |
| 10 | 400 | (2.0) | EPH I | 393 | (2.0) | DISA 2 | 986 | (1.0) | SPH | 2947 | 76 |
|    | 1000 | (2.0) | EPH II |   |       |        | 168 | (1.0) | INA |      |     |

[1] Molecular Weight, Calculated
[2] Amine Number, mg KOH/g

TABLE 3

| Binder Combination (BC) | Parts of Solid Substance Binder (ex Example)* | Crosslinking Agent | Catalyst | Neutralization |
|---|---|---|---|---|
| 1  | 100 (1)/65 EP | —    | 1.0 Sn | 40 |
| 2  | 70 (2)/60 EP  | 30 H 1 | 1.0 Sn | 35 |
| 3  | 75 (3)/70 MP  | 25 H 2 | 1.2 Pb | 40 |
| 4  | 70 (4)/65 MP  | 30 H 1 | 0.8 Sn | 35 |
| 5  | 100 (5)/60 MP | 20 H 1 | 1.0 Sn | 30 |
| 6  | 80 (6)/65 MP  | 20 H 1 | 1.0 Sn | 35 |
| 7  | 70 (7)/60 EP  | 30 H 2 | 0.8 Pb | 40 |
| 8  | 80 (8)/65 MP  | 20 H 1 | 1.0 Sn | 45 |
| 9  | 75 (9)/60 EP  | 25 H 1 | 1.0 Sn | 30 |
| 10 | 100 (10)/60 MP | —   | 0.6 Sn | 35 |

*The figures refer to the percentage strength and the solvent in which the binder is present.

TABLE 4

| Paint from BC | Layer Thickness* μm | Salt Spray Test Infiltration After 360 hours (mm) |
|---|---|---|
| 1 | 35 | 2 |
| 2 | 32 | 3 |
| 3 | 43 | 2.5 |
| 4 | 29 | 1 |
| 5 | 31 | 1 |
| 6 | 32 | 1 |
| 7 | 35 | 2 |
| 8 | 40 | 3 |
| 9 | 30 | 1 |
| 10 | 28 | 1.5 |
| V | 24 | 6.5 |

*Maximum layer thickness achievable at a bath temperature of 32° C. and a coating time of 135 seconds.

As will be apparent to one skilled in the art, various modifications can be made within the scope of the aforesaid description. Such modifications being within the ability of one skilled in the art form a part of the present invention and are embraced by the appended claims.

It is claimed:

1. Process for the preparation of binders which are based on amine-modified epoxy resins and which are water-dilutable after complete or partial neutralization with inorganic and/or organic acids, characterized in that 5 to 60 mol % of the epoxy groups of a resinous component having at least two 1,2-epoxy groups per molecule are reacted at 60° to 120° C. with a disecondary diamine of the general formula—

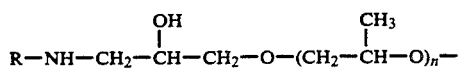

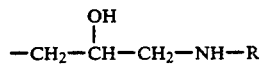

and/or

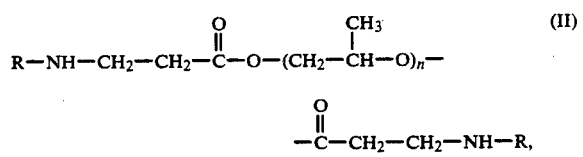

wherein R is an alkyl group having 4 to 18 carbon atoms, and n is an integer of 2 through 12, and the remainder of the epoxy groups are reacted at 60° to 120° C. with amines and/or carboxylic acids and/or substituted phenols, the amount of the basic components being so chosen in order that the end product has a theoretical amine number of at least 30 mg KOH/g.

2. The process according to claim 1 wherein said alkyl group of R is a monohydroxyalkyl group.

3. The process according to claim 1 wherein said alkyl group of R is a dihydroxyalkyl group.

4. The process according to claim 1 wherein said alkyl group of R is a tertiary-aminoalkyl group.

5. The process according to claim 1 wherein 10 to 35 mol % of the epoxy groups of the resinous component are reacted with the disecondary diamine, and the end product has a theoretical amine number of from 50 to 110 mg KOH/g.

6. The process according to claim 1 further characterized in that the disecondary diamine of formula (I) is the reaction product of 1 mol of a polypropylene glycol diglycidylether having a molecular weight between 200 and 800 with 2 mols of a compound containing a primary amino group.

7. The process according to claim 1 further characterized in that the disecondary diamine of formula (II) is the reaction product of 1 mol of a dipropylene glycol diacrylate and/or polypropylene glycol diacrylate with 2 mols of a compound containing a primary amino group.

8. The process according to claim 6 or 7 further characterized in that the compound containing a primary amino group is a primary monoalkylamine and/or a primary alkanolmonoamine having one or two hydroxyl group(s) and/or a primary-tertiary alkyldiamines.

9. The process according to claim 6 further characterized in that the disecondary diamines of formula (I) are subjected, immediately after they have been prepared, to a washing process in order to reduce their content of hydrolyzable chlorine.

10. Paint binders based on amine-modified epoxy resins which are water-dilutable after complete or partial neutralization with inorganic and/or organic acids comprising the reaction product of a resinous component having at least two 1,2-epoxy groups per molecule and a disecondary diamine of the general formula—

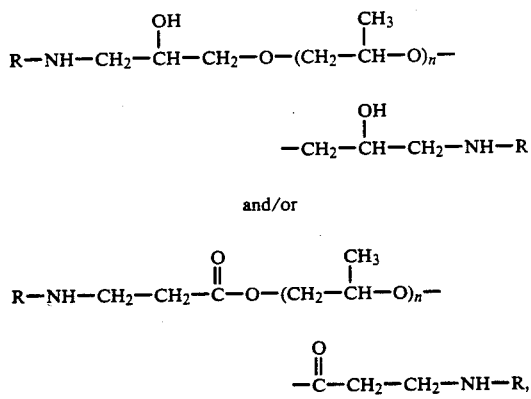

and/or wherein R is an alkyl group having 4 to 18 carbon atoms, and n is an integer of 2 through 12, wherein 5 to 60 mol% of the epoxy groups of said resinous component are reacted with said disecondary diamine, and the remainder of the epoxy groups are reacted with amines and/or carboxylic acids and/or substituted phenols, the amount of the basic components being so chosen in order that said binder has a theoretical amine number of at least 30 mg KOH/g.

11. The paint binder according to claim 10 wherein said alkyl group of R is a monohydroxyalkyl group.

12. The paint binder according to claim 10 wherein said alkyl group of R is a dihydroxyalkyl group.

13. The paint binder according to claim 10 wherein said alkyl group of R is a tertiary-aminoalkyl group.

14. The paint binder according to claim 10 wherein 10 to 35 mol % of the epoxy groups of the resinous component are reacted with the disecondary diamine, and the end product has a theoretical amine number of from 50 to 110 mg KOH/g.

15. The paint binder according to claim 10 wherein the disecondary diamine of formula (I) is the reaction product of 1 mol of a polypropylene glycol diglycidylether having a molecular weight between 200 and 800 with 2 mols of a compound containing a primary amino group.

16. The paint binder according to claim 10 wherein the disecondary diamine of formula (II) is the reaction product of 1 mol of a dipropylene glycol diacrylate and/or polypropylene glycol diacrylate with 2 mols of a compound containing a primary amino group.

17. The paint binder according to claim 15 or 16 wherein the compound containing a primary amino group is a primary monoalkylamine and/or a primary alkanolmonoamine having one or two hydroxyl group(s) and/or a primary-tertiary alkyldiamines.

* * * * *